US009247103B2

(12) United States Patent
Niina et al.

(10) Patent No.: US 9,247,103 B2
(45) Date of Patent: Jan. 26, 2016

(54) IMAGE PROCESSING DEVICE, IMAGE PROCESSING SYSTEM, NON-TRANSITORY COMPUTER READABLE MEDIUM, AND IMAGE PROCESSING METHOD

(75) Inventors: Hiroshi Niina, Kanagawa (JP); Toshiyuki Yamada, Kanagawa (JP); Hiroshi Hayashi, Kanagawa (JP); Kenji Ueda, Kanagawa (JP); Tatsuya Namiki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 102 days.

(21) Appl. No.: 13/559,028

(22) Filed: Jul. 26, 2012

(65) Prior Publication Data

US 2013/0222855 A1    Aug. 29, 2013

(30) Foreign Application Priority Data

Feb. 28, 2012    (JP) .................................. 2012-041443

(51) Int. Cl.
*G06K 15/00*    (2006.01)
*H04N 1/333*    (2006.01)
*H04N 1/40*    (2006.01)

(52) U.S. Cl.
CPC .. *H04N 1/33315* (2013.01); *H04N 2201/33335* (2013.01); *H04N 2201/33378* (2013.01)

(58) Field of Classification Search
CPC ........... H04N 2201/33335; H04N 2201/33378
See application file for complete search history.

(56) References Cited

U.S. PATENT DOCUMENTS

| 2004/0234169 A1* | 11/2004 | Tojo ............................... 382/305 |
| 2009/0067727 A1* | 3/2009 | Hirohata ....................... 382/201 |
| 2009/0213428 A1* | 8/2009 | Klippenstein ................ 358/1.18 |

FOREIGN PATENT DOCUMENTS

| JP | 2006203632 A | * | 8/2006 |
| JP | A-2006-203632 | | 8/2006 |

* cited by examiner

*Primary Examiner* — Ashish K Thomas
*Assistant Examiner* — Neil R McLean
(74) *Attorney, Agent, or Firm* — Oliff PLC

(57) ABSTRACT

Provided is an image processing device including an image target separating unit that separates a read printed document into image targets, a page aggregation state determining unit that determines a page aggregation state of the read printed document based on a layout of the image targets separated by the image target separating unit, a printing direction determining unit that determines a printing direction of each of pages determined by the page aggregation state determining unit based on a features of each of the image targets separated by the image target separating unit, and a document format converting unit that converts a document format of the read printed document based on the results of the determination by the page aggregation state determining unit and the printing direction determining unit.

14 Claims, 13 Drawing Sheets

INPUT IMAGE

OBJECT LIST

| id | posX | posY | width | height | TYPE | COLOR | ERECTED DIRECTION |
|---|---|---|---|---|---|---|---|
| 01 | x1 | y1 | w1 | h1 | TEXT | R/G/B | TOP |
| 02 | x2 | y2 | w2 | h2 | FIGURE | R/G/B | - |
| 03 | x3 | y3 | w3 | h3 | TEXT | R/G/B | RIGHT |
| 04 | x4 | y4 | w4 | h4 | FIGURE | R/G/B | - |
| 05 | x5 | y5 | w5 | h5 | PHOTO | R/G/B | - |
| 06 | x6 | y6 | w6 | h6 | DRAWING | R/G/B | - |

TAG IMAGE

OBJECT IMAGE

FIG. 7
INPUT IMAGE
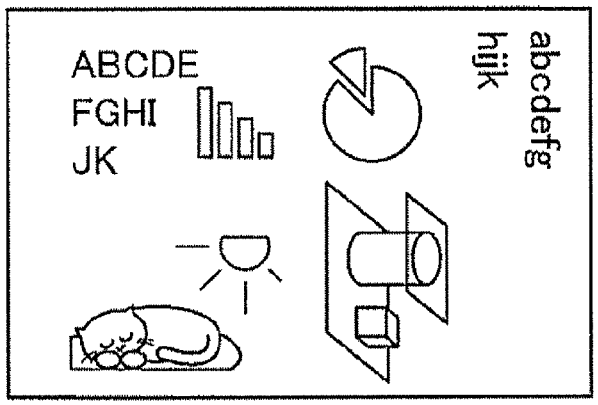
OBJECT LIST
| id | posX | posY | width | height | TYPE | COLOR | ERECTED DIRECTION |
|----|------|------|-------|--------|------|-------|-------------------|
| 01 | x1 | y1 | w1 | h1 | TEXT | R/G/B | TOP |
| 02 | x2 | y2 | w2 | h2 | FIGURE | R/G/B | - |
| 03 | x3 | y3 | w3 | h3 | TEXT | R/G/B | RIGHT |
| 04 | x4 | y4 | w4 | h4 | FIGURE | R/G/B | - |
| 05 | x5 | y5 | w5 | h5 | PHOTO | R/G/B | - |
| 06 | x6 | y6 | w6 | h6 | DRAWING | R/G/B | - |
(CONT.)

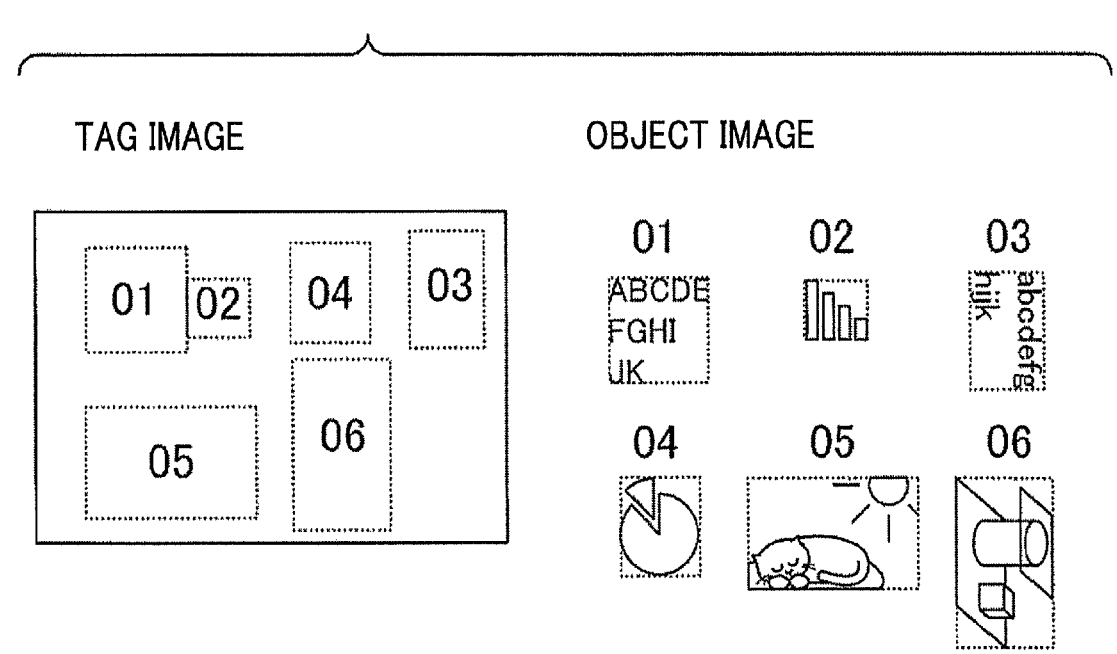

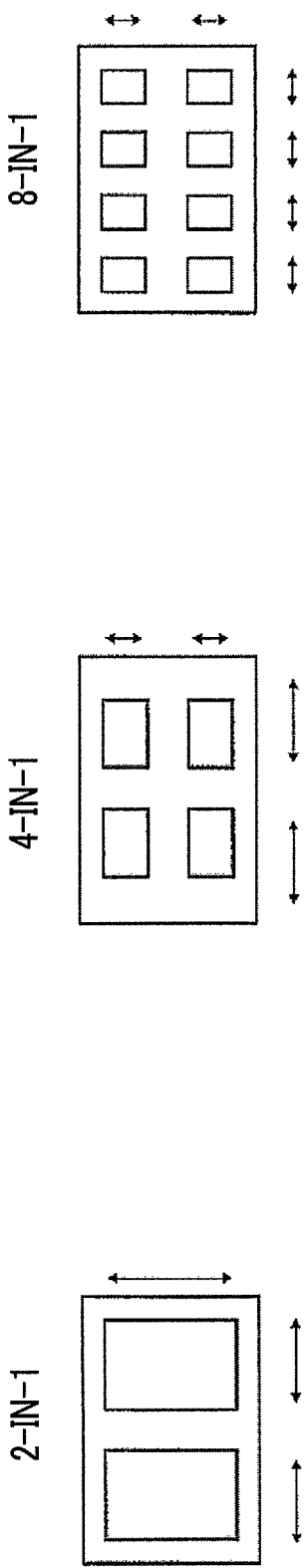
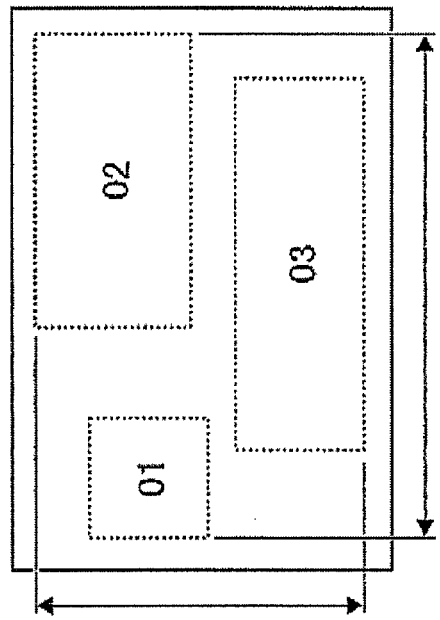
FIG. 8B
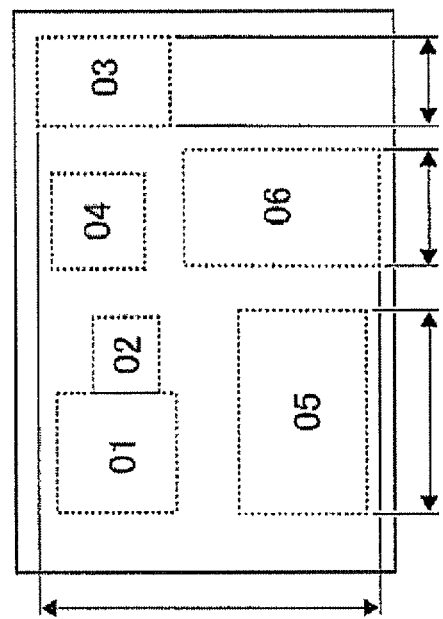
FIG. 8A

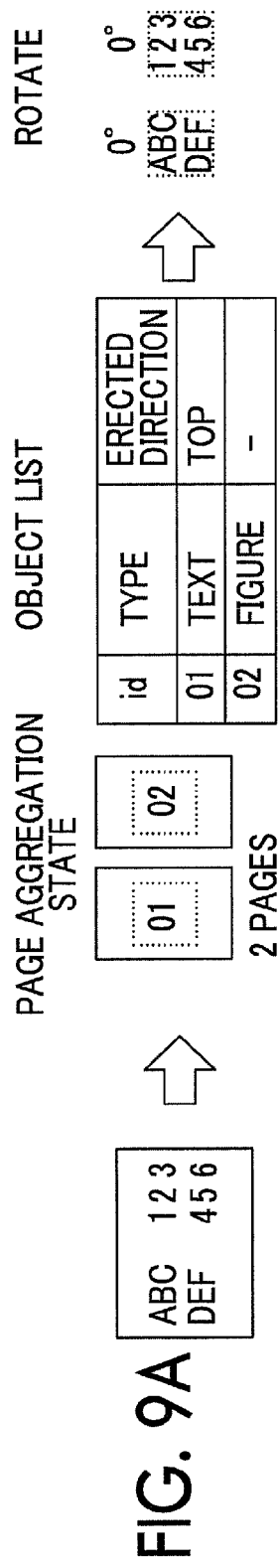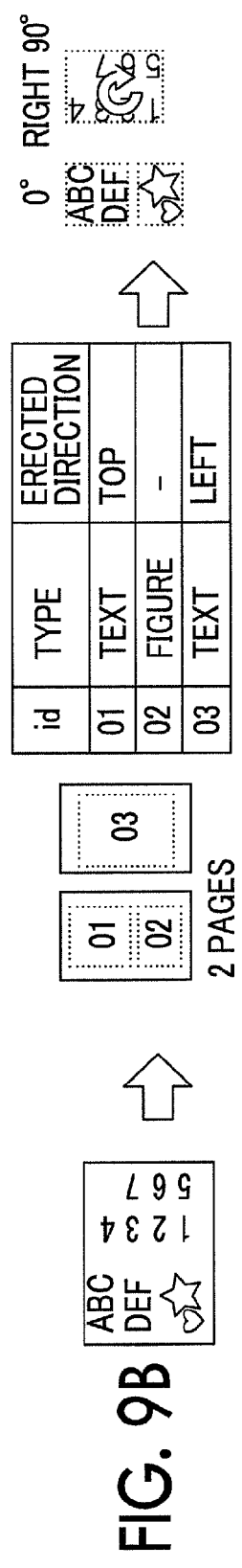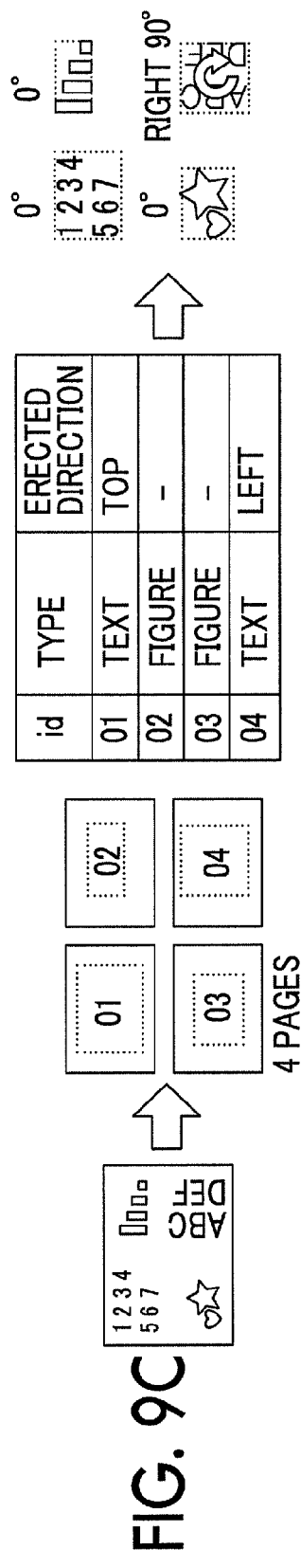

IMAGE PROCESSING DEVICE, IMAGE PROCESSING SYSTEM, NON-TRANSITORY COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2012-041443 filed Feb. 28, 2012.

BACKGROUND

1. Technical Field

The invention relates to an image processing device, an image processing system, a non-transitory computer readable medium, and an image processing method.

SUMMARY

According to an aspect of the invention, there is provided an image processing device including: an image target separating unit that separates a read printed document into image targets; a page aggregation state determining unit that determines a page aggregation state of the read printed document based on a layout of the image targets separated by the image target separating unit; a printing direction determining unit that determines a printing direction of each of pages determined by the page aggregation state determining unit based on features of each of the image targets separated by the image target separating unit; and a document format converting unit that converts a document format of the read printed document based on the results of the determination by the page aggregation state determining unit and the printing direction determining unit.

BRIEF DESCRIPTION OF THE DRAWINGS

Exemplary embodiments of the present invention will be described in detail based on the following graphics, wherein:

FIG. 7 is a diagram illustrating an object list generated from an input image to which an exemplary embodiment of the invention is applied;

FIGS. 8A and 8B are schematic views of a page aggregation state determination process to which an exemplary embodiment of the invention is applied;

FIGS. 9A to 9C are schematic views of a printing direction determination process to which an exemplary embodiment of the invention is applied;

DETAILED DESCRIPTION

Hereinafter, exemplary embodiments of the present invention will be described in detail with reference to the drawings.

Figure 1:
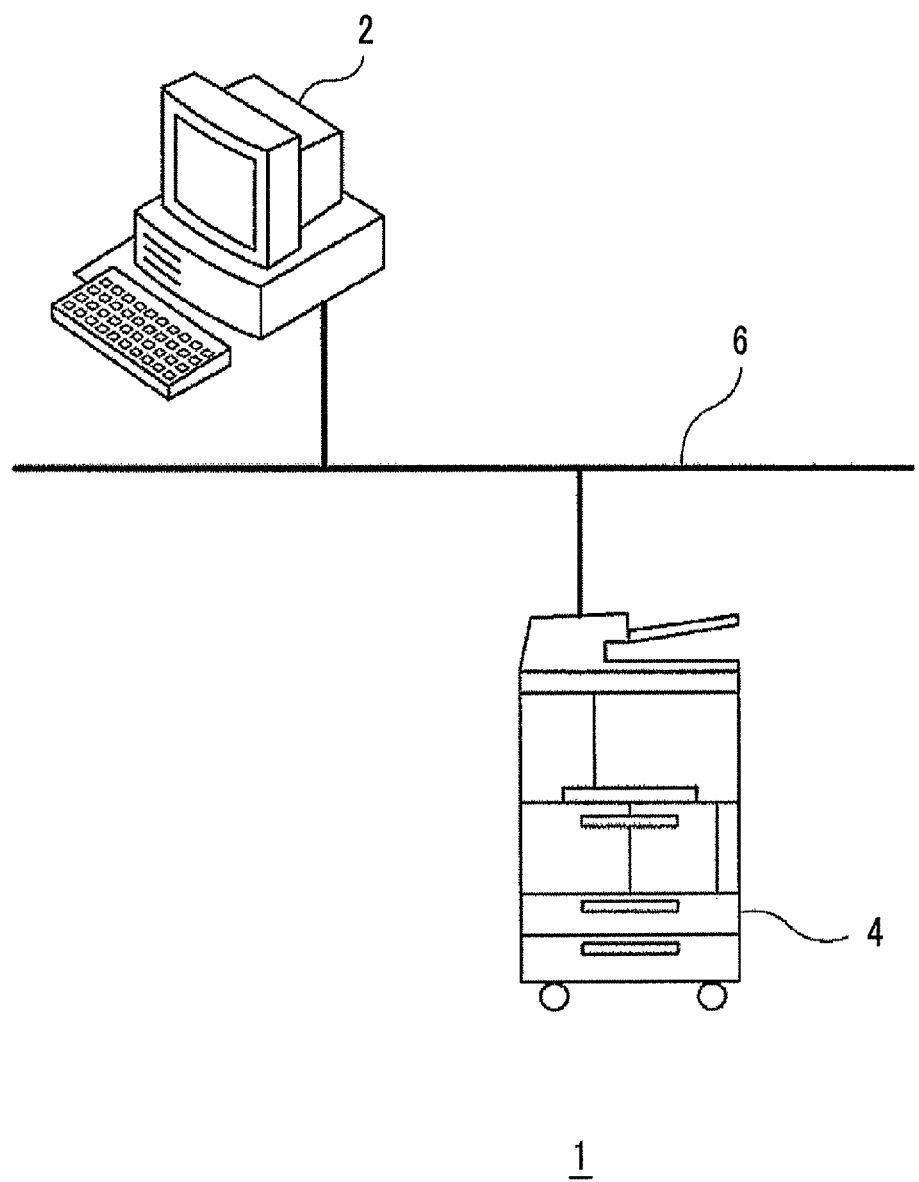
FIG. 1 is a view illustrating an entire configuration of an image processing system to which an exemplary embodiment of the invention is applied.

FIG. 1 illustrates an entire configuration of an image processing system 1 according to an exemplary embodiment of the invention.

The image processing system 1 includes a terminal device 2, an image forming apparatus 4, and a network 6. The terminal device 2 and the image forming apparatus 4 are connected to each other via the network 6.

The terminal device 2 generates print information and transmits the print information to the image forming apparatus 4 via the network 6.

The image forming apparatus 4 receives print information from the terminal device 2 or the like and outputs an image corresponding to the print information on a recording medium such as a sheet. The image forming apparatus 4 is a multi-functional machine having multiple functions such as a print function, a scanning function, a copying function, and a faxing function.

Figure 2:
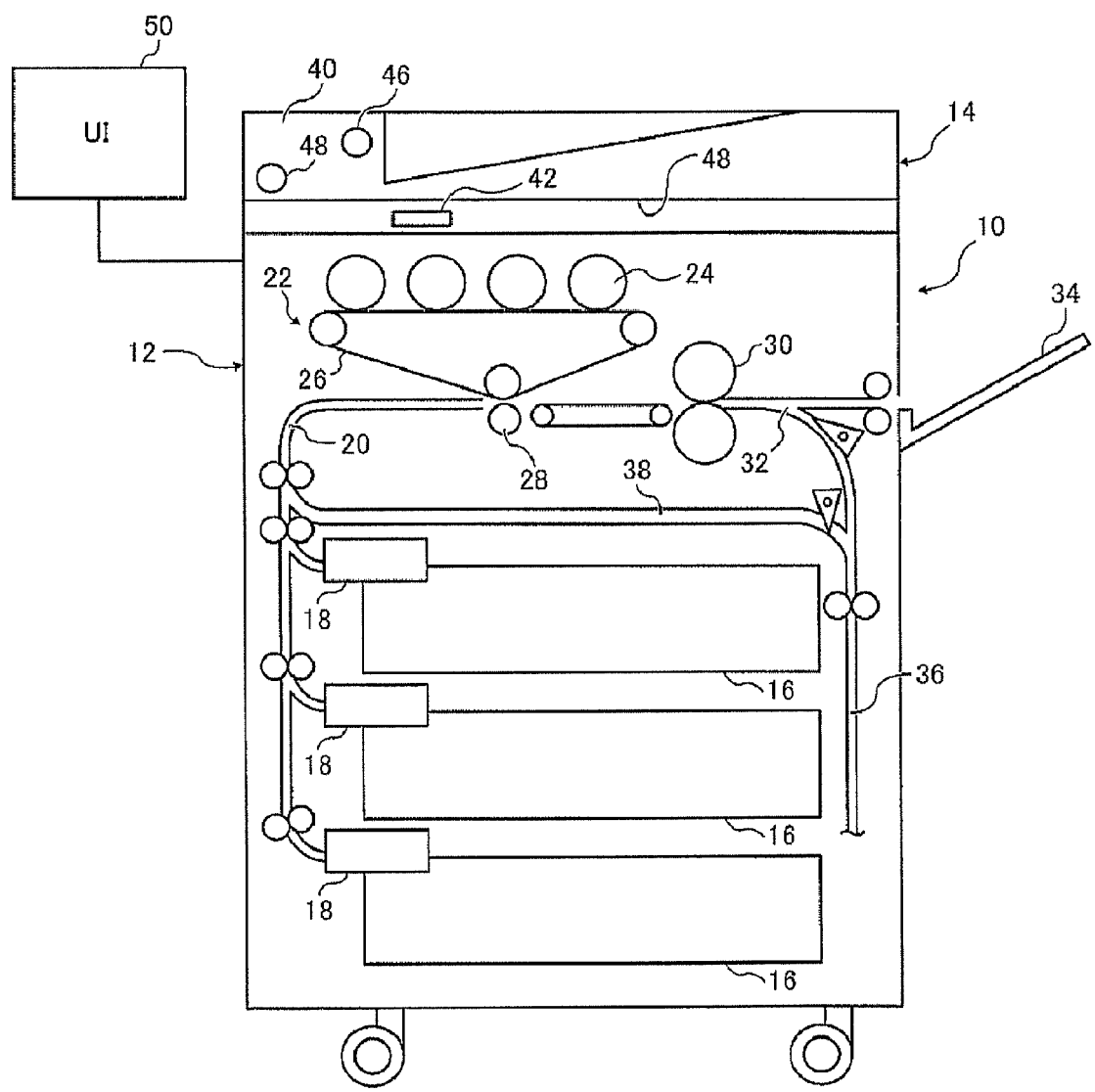
FIG. 2 is a schematic view of an image forming apparatus to which an exemplary embodiment of the invention is applied.

FIG. 2 illustrates a schematic configuration of the image forming apparatus 4.

The image forming apparatus 4 includes a printing device 12 and an image reading device 14.

The printing device 12 includes three layers of recording medium supply trays 16, for example, and a supply head 18 is provided to each of the recording medium supply trays 16. When one of the recording medium supply trays 16 is selected, the corresponding supply head 18 operates so that a recording medium is supplied from the recording medium supply tray 16 to a print engine 22 via a recording medium supply path 20.

The print engine 22 is configured as a color-and-monochrome xerography print engine and includes yellow, magenta, cyan and black photoreceptors 24 and an intermediate transfer belt 26. A charging device, an exposure device, a developing device, a primary transfer device, a cleaning device, and the like, which are not illustrated, are arranged around each of the photoreceptors 24. Toner images formed on the respective photoreceptors 24 are transferred to the intermediate transfer belt 26. In the case of monochrome printing, only the black photoreceptor 24 operates. The toner images transferred on the intermediate transfer belt 26 are transferred to a recording medium by a secondary transfer roll 28. The toner images on the recording medium are fixed by a fixing device 30. Then, the recording medium is output to a discharge tray 34 via a recording medium discharge path 32.

When double-sided printing is performed, the recording medium having passed through the fixing device 30 is delivered from the recording medium discharge path 32 to a reversing device 36 and is reversed by the reversing device 36. The reversed recording medium is delivered to a recording medium reversing path 38 and is returned to the recording medium supply path 20. Then, the recording medium is delivered to the print engine 22, and printing is performed on the reverse side.

The image reading unit 14 has an automatic document feeder 40 such as a duplex auto document feeder (DADF) capable of reading both sides of a document. A document mounted on the automatic document feeder 40 is delivered to a platen 42, and an image of the document is read, on the platen 42, by a reading unit 44 that includes a CCD or the like.

The automatic document feeder 40 includes a document mounting state detector 46 and a platen cover opening/closing detector 48. The document mounting state detector 46 detects whether a document is mounted on the automatic document feeder 40. The platen cover opening/closing detector 48 detects the opening and closing of the automatic document feeder 40 that also functions as a platen cover. A document may be mounted on the platen 42 when the automatic document feeder 40 (platen cover) is opened.

A user interface (UI) device 50 is provided integrally with the image forming apparatus 4 or via a network, and exchanges information with an operator. Specifically, the UI device 50 includes a touch panel, a liquid crystal display, a keyboard, and the like. The UI device 50 receives the content of a process to be performed by the image forming apparatus 4, selected by an operator and displays the selected content.

Figure 3:
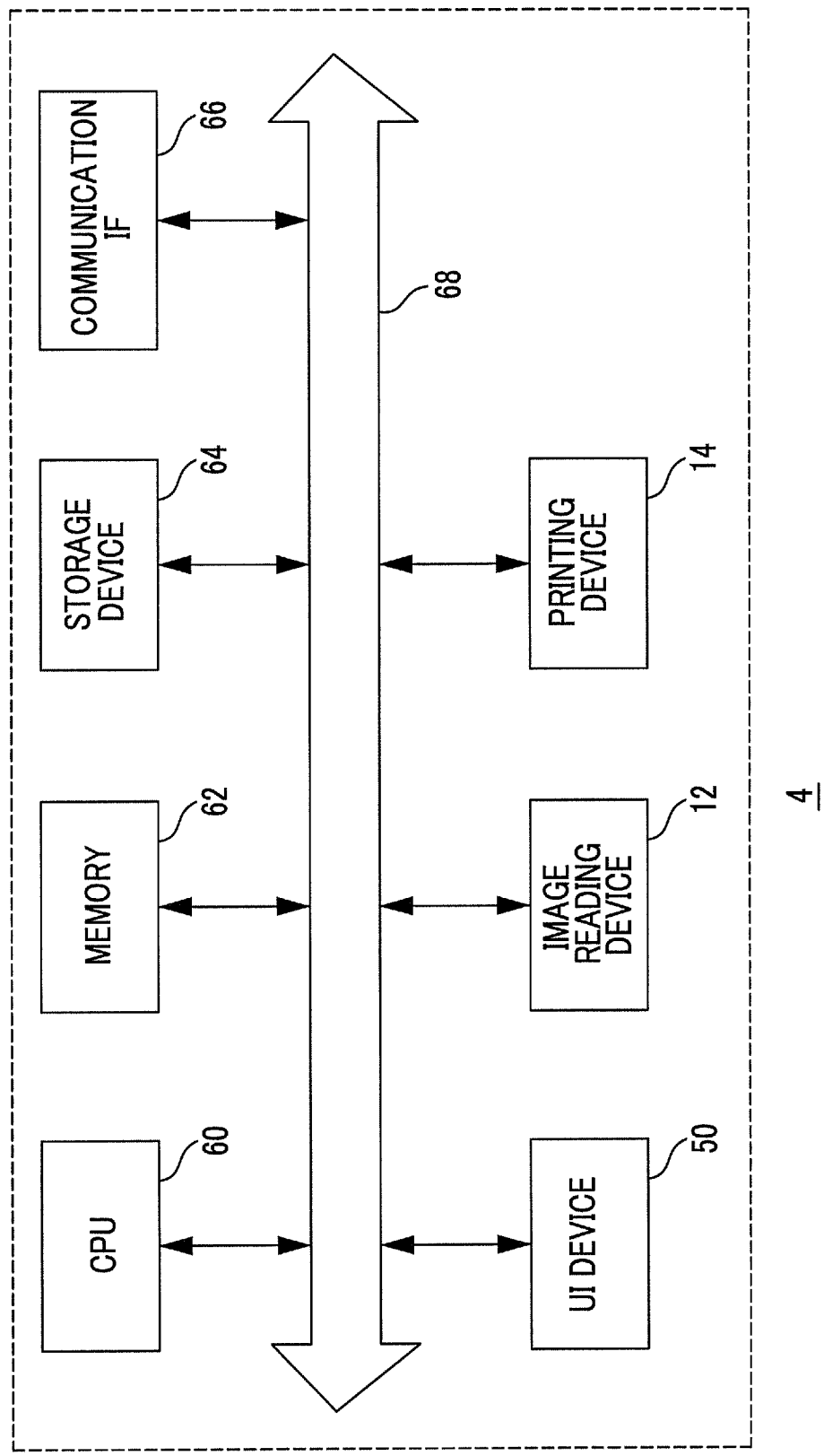
FIG. 3 is a view illustrating a hardware configuration of the image forming apparatus to which an exemplary embodiment of the invention is applied.

FIG. 3 illustrates a hardware configuration of the image forming apparatus 4.

The image forming apparatus 4 includes a CPU 60, a memory 62, a storage device 64 such as a hard disk (HDD), a communication interface (IF) 66 that transmits and receives information to and from an external device or the like via the network 6, the UI device 50, the printing device 12, and the image reading device 14.

These constituent components are connected to each other via a control bus 68.

The CPU 60 executes a predetermined process based on a control program stored in the memory 62 or the storage device 64 and controls the operation of the image forming apparatus 4. The control program may be stored in a storage medium such as a CD-ROM and provided to the CPU 60.

Figure 4:
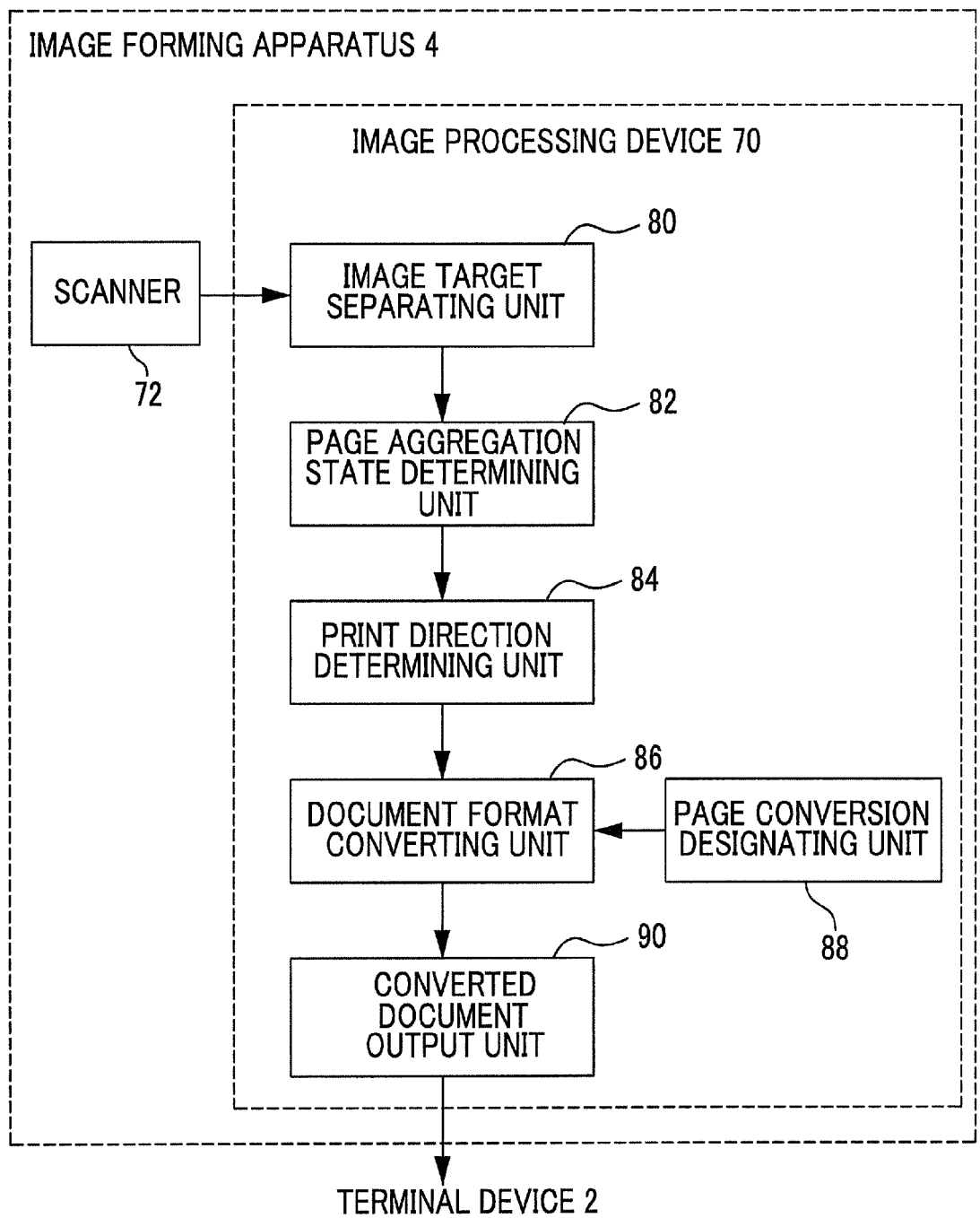
FIG. 4 is a view illustrating a functional configuration of the image forming apparatus which is implemented by executing a control program to which an exemplary embodiment of the invention is applied.

FIG. 4 illustrates a functional configuration of the image forming apparatus 4, which is implemented when the control program is executed.

The image forming apparatus 4 includes an image processing device 70 and a scanner 72. The image forming apparatus 4 is configured such that the scanner 72 reads an image (printed document) on a recording medium as image information, and the image processing device 70 performs a predetermined process on the read image information.

The image processing device 70 includes an image target separating unit 80, a page aggregation state determining unit 82, a printing direction determining unit 84, a document format converting unit 86, a page conversion designating unit 88, and a converted document output unit 90.

The image target separating unit 80 separates a read printed document into respective image targets (objects) (object separation). Specifically, the image target separating unit 80 determines the type (text, graphic, or picture) of each of the objects included in the printed document read by the scanner 72 and separates the image information of each of the objects.

The page aggregation state determining unit 82 determines a page aggregation state of the printed document based on a layout of the objects. The page aggregation state represents the number of pages printed (aggregated) together on one sheet of the printed document and the layout state thereof, and examples thereof include 2-UP and 4-UP. Hereinafter, respective pages (originally single pages) aggregated in the printed document are sometimes referred to as "original pages."

The printing direction determining unit 84 determines a printing direction of each of the pages aggregated in the printed document. The printing direction represents a direction in which one sheet of the page is to be printed when one sheet of the page is printed without being aggregated. For example, the vertical directions of respective pages aggregated in a printed document may be different from each other when some pages are oriented vertically and the others are oriented laterally. In such a case, the printing direction determining unit 84 determines the printing direction (vertical direction) of each of the pages.

The document format converting unit 86 converts a document format of the read printed document. The document format includes the state of a document recognized as one page, a file format of the document state information, and the like.

For example, the document format converting unit 86 converts the document format of the printed document including multiple aggregated pages into the formats of each original page or converts the read printed document into a file format of a predetermined application program.

The page conversion designating unit 88 designates whether or not to convert the document format of the printed document including multiple aggregated pages for each of the pages.

The converted document output unit 90 outputs the converted document format to a predetermined device such as the terminal device 2.

Next, an overview of a processing operation of the image processing device 70 on the read printed document will be described.

Figure 5:
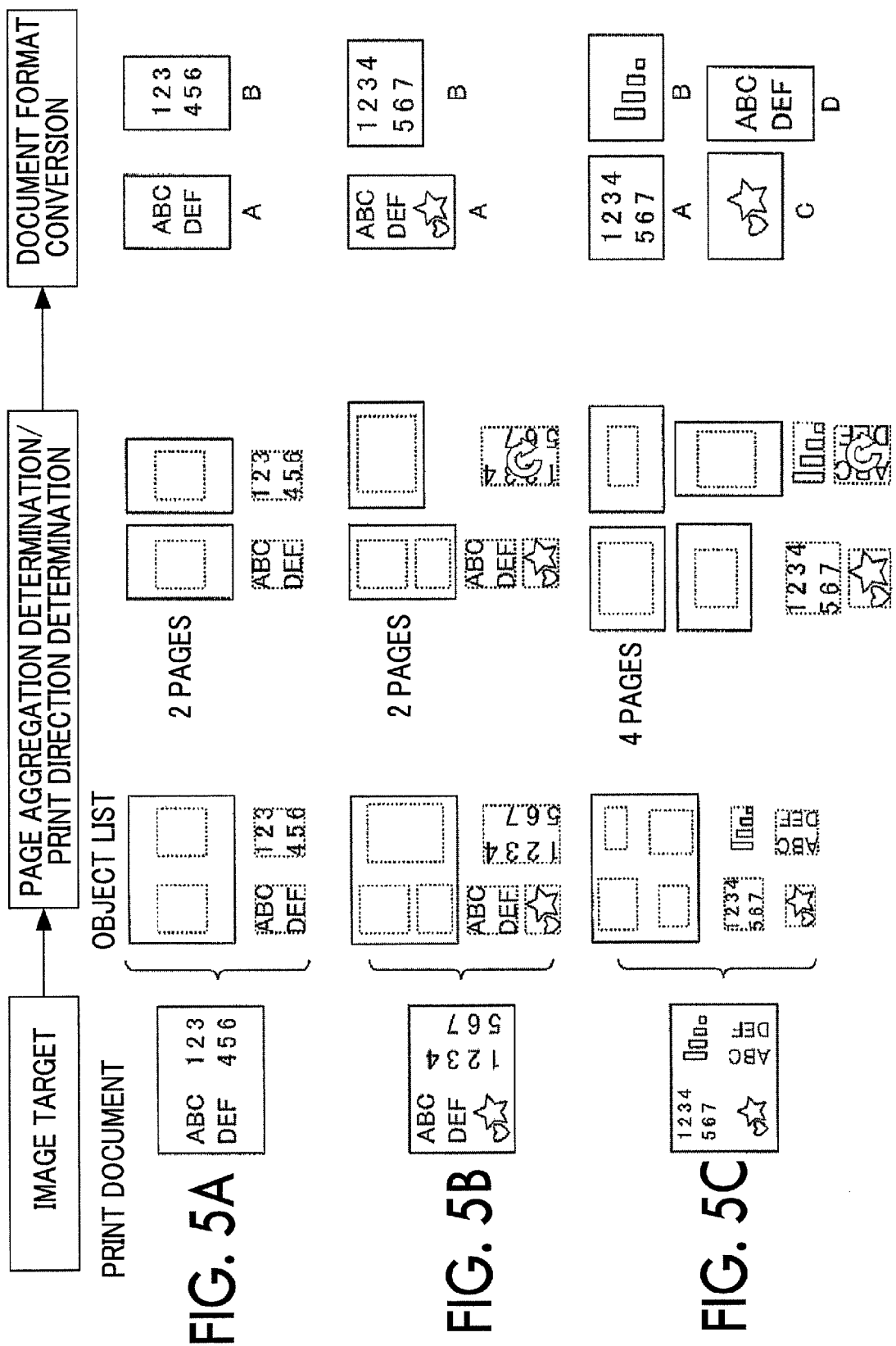
FIGS. 5A to 5C are views schematically illustrating an overview of a processing operation of the image processing device to which an exemplary embodiment of the invention is applied.

FIGS. 5A to 5C schematically illustrate an overview of the processing operation of the image processing device 70.

First, the read printed document is separated into objects and an object list is created. The object list includes a layout of each of the objects, an object type, and an erected direction (vertical direction), and the like.

Subsequently, a page aggregation state is determined from the layouts of the respective objects based on the object list. Moreover, the printing direction of an original page is determined based on the features of objects included in the original page. Examples of the features of the objects include the erected direction (vertical direction) of text included in the original page.

Subsequently, the printed document is separated into original pages based on the determination result of the page aggregation state and the determination result of the printing direction. Moreover, the objects included in each of the original pages are erected (the vertical directions thereof are corrected), and the document format is converted.

In this way, new document information (application data) of which the document format is converted is generated. A sheet size applied to the new document information is set appropriately. For example, when the sheet size of the read printed document is "A3," and the page aggregation state thereof is "2-in-1 (2-UP)," the sheet may be divided so that respective original pages are printed in an "A4-size" region. Alternatively, the sheet size may be set appropriately when printing the original pages.

Next, details of the processing operation of the image processing device 70 will be described.

Figure 6:
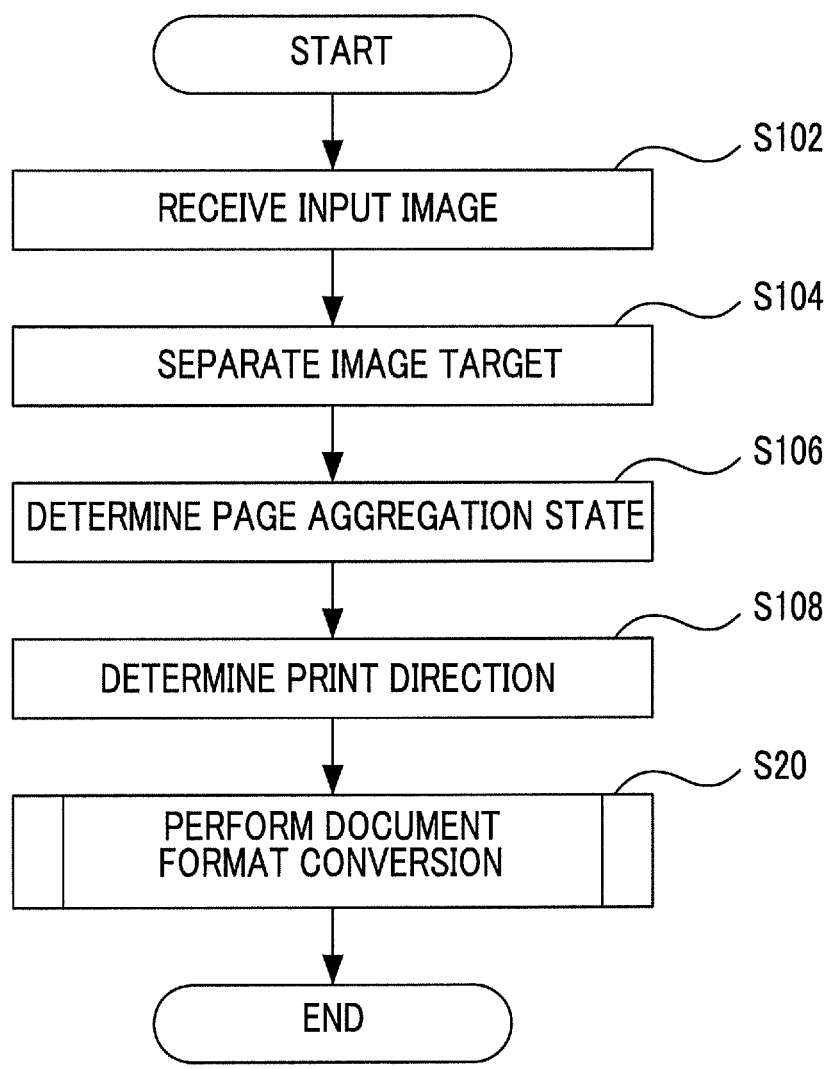
FIG. 6 is a flowchart of the processing operation of the image processing device to which an exemplary embodiment of the invention is applied.

FIG. 6 illustrates the flowchart of the processing operation (S10) of the image processing device 70.

In step S102, the image target separating unit 80 receives a printed document, which has been read by the scanner 72 as image information, as an input image.

In step S104, the image target separating unit 80 separates the received input image into objects. FIG. 7 illustrates an object list created from the input image.

As illustrated in FIG. 7, the image target separating unit 80 assigns an identification number to each of the objects included in the input image and associates a layout (for example, X-position, Y-position, width, height), a type (for example, text, graphic, drawing, or picture), a color, and an erected direction with the identification number. The content of the object list is schematically illustrated as a tag image and an object image.

The erected direction of an object is detected from objects of which the type is detected to be text by an optical character reader (OCR), for example.

In step S106, the page aggregation state determining unit 82 determines the page aggregation state of the read printed document based on the layout of the objects separated by the image target separating unit 80. FIGS. 8A and 8B schematically illustrate an overview of a page aggregation state determination process.

As illustrated in FIGS. 8A and 8B, the page aggregation state determining unit 82 detects a boundary line from an overlap between objects and compares the boundary line with the layout of the page aggregation states (for example, 2-in-1, 4-in-1, and 8-in-1) stored in advance. Moreover, a page aggregation state that has a dividing line matching the detected boundary line is determined as the page aggregation state of the printed document.

Examples of the page aggregation state include the number of pages (the number of divisions) and a layout method of respective pages. However, the examples are not limited to these examples, and the page aggregation state may be set appropriately.

In the example of FIG. 8A, a boundary portion where objects do not overlap is present in the central portion in the lateral direction only. Thus, the page aggregation state is determined to be the layout of "2-in-1."

In the example of FIG. 8B, the boundary portion where objects do not overlap is neither present in the lateral direction nor in the vertical direction. Thus, the page aggregation state is determined to be the layout of "1-in-1" (that is, multiple pages are not aggregated).

In the following description, for the sake of convenience, the page aggregation state is sometimes represented just by the number of divided pages.

When multiple pages of images are input, the page aggregation state determining unit 82 may first determine the page aggregation state of all of the multiple pages and then select the page aggregation state of a page which is determined to include the smallest number of aggregated pages among all of the pages. For example, when four pages of images are input, and the numbers of pages aggregated in the first to fourth pages are "2," "4," "8," and "4," respectively, the page aggregation state of "2" of the page including the smallest number of aggregated pages is selected as the page aggregation states of all of the four pages of input images.

In step S108, the printing direction determining unit 84 determines the printing direction of each of the original pages based on the erected direction detected for each object. FIGS. 9A to 9C illustrate a schematic view of a printing direction determination process.

As illustrated in FIGS. 9A to 9C, the printing direction determining unit 84 determines the printing direction of each of the original pages based on the result of the page aggregation state determined by the page aggregation state determining unit 82 and the erected direction detected for each object. Specifically, the printing direction of an original page including text is determined based on the erected direction detected for the original page including objects of which the type is text.

Moreover, a rotating process (a rotation angle) necessary for erecting objects included in each of the original pages is determined based on the determination result of the printing direction. Hereinafter, the rotating process performed in order to erect objects will be referred to as an "erecting process."

For example, when three objects are included in an original page, and the types thereof are text, graphic, and picture, the printing direction is determined based on the erected direction detected for the text object, and the three objects included in the original page are rotated based on the determination result of the printing direction.

In this exemplary embodiment, when it is not possible to detect the erected direction of the original page (for example, when a text object is not included in the original page), printing direction determining unit 84 determines that the printing direction of the present page is the same as that of the previous page. Specifically, when it is possible to detect the erected direction of a page on the left side of a printed document whereas it is not possible to detect the erected direction of a page on the right side, the printing direction of the right-side page is assumed to be the same as the left-side page.

In this exemplary embodiment, when the erected direction of an original page is indefinable (for example, a text object is not included in any of the original pages included in a printed document), the printing direction determining unit 84 determines that the printing direction is "indefinable."

In the example of FIG. 9A, the page aggregation state is "2." Moreover, since the left and right-side pages are made up of only text objects, the erected directions thereof are "TOP." Thus, the printing directions of the left and right-side pages are also determined to be "TOP."

Thus, the rotating process necessary for the erecting process is "0°" for all original pages.

In the example of FIG. 9B, the page aggregation state is "2." Moreover, since the left-side page includes a text object, the erected direction thereof is "TOP." On the other hand, since the right-side page is made up of only text images, the erected direction thereof is "LEFT." Thus, the printing direction is determined to be "TOP" and "LEFT" for the left and right-side pages, respectively.

Thus, the necessary rotating process is "0°" for the left-side original page and "RIGHT 90°" for the right-side original page.

In the example of FIG. 9C, the page aggregation state is "4." Moreover, since the left-top page is made up of only text objects, the erected direction thereof is "TOP." Since the right-top and left-bottom pages do not include a text object, the erected directions thereof are not detected. Since the right-bottom page is made up of only text objects, the erected direction thereof is "LEFT." In this exemplary embodiment, the printing direction of an original page of which the erected direction is not detected is determined to be the same printing direction as that of the previous page. Thus, the printing direction is determined to be "TOP" for the left-top page, "TOP" for both the right-top and left-bottom pages, and "LEFT" for the right-bottom page.

Thus, the necessary rotating process is "0°" for the left-top, right-top, and left-bottom pages and "RIGHT 90°" for the right-bottom page.

As for original pages of which the erected direction is indefinable, the erecting process may be not performed (that is, the rotating process is set to "0°"), or the rotating process thereof may be set individually for the respective original pages. The same treatment may be applied to original pages of which the erected direction is not detected.

Moreover, when multiple objects are included in one original page, different rotating processes may be applied to respective objects included in the original page. For example, in the same original page, the erecting process may be applied to only a text object included in the original page, the rotating process may be not applied to graphic objects or the like, and the rotating process may be set individually for the respective graphic objects or the like.

Figure 10A:
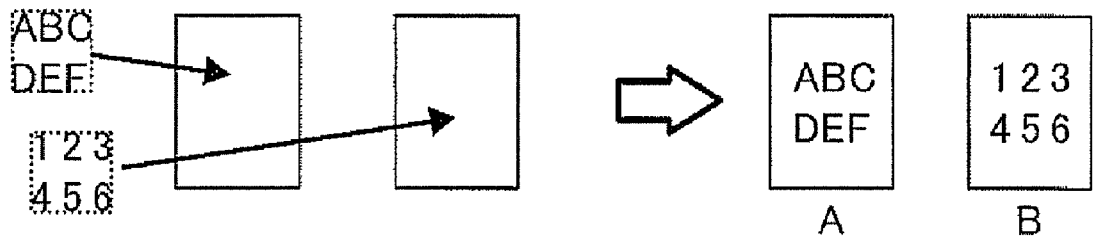
FIGS. 10A to 10C are schematic views of a document format conversion process to which an exemplary embodiment of the invention is applied.
Figure 10B:
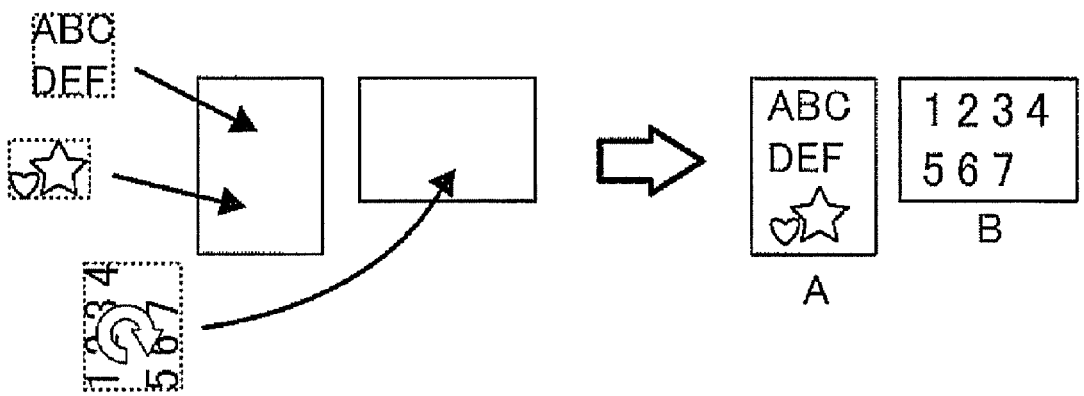
Figure 10C:
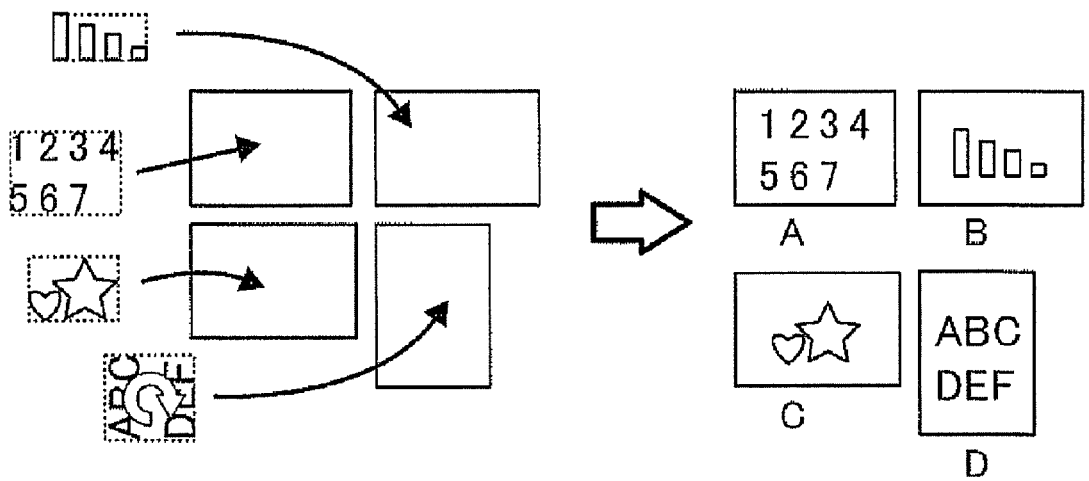

In step S20, the document format converting unit 86 converts the document format of the read printed document based on the result of the determination by the page aggregation state determining unit 82 and the result of the determination by the printing direction determining unit 84. FIGS. 10A to 10C schematically illustrate an overview of a document format conversion process.

As illustrated in FIGS. 10A to 10C, the document format converting unit 86 separates the read printed document into respective original pages based on the result of the page aggregation state determined by the page aggregation state determining unit 82 and the result of the printing direction determined by the printing direction determining unit 84 and converts the printed document into a document format in which the objects included in each of the original pages are rotated in the erected direction.

In the example of FIG. 10A, the page aggregation state is "2" and the necessary rotating process is "0°" for both the left and right-side pages. Thus, both the left and right-side pages are not rotated, and the printed document is divided into page A corresponding to the left-side page and page B corresponding to the right-side page. Moreover, a document format having a predetermined file format is generated for these pages A and B.

In the example of FIG. 10B, the page aggregation state is "2," and the necessary rotating process is "0°" for the left-side page and "RIGHT 90°" for the right-side page. Thus, the left-side page is not rotated, the right-side page is rotated right by 90°, and the printed document is divided into page A corresponding to the left-side page and page B corresponding to the right-side page. Moreover, a document format having a predetermined file format is generated for these pages A and B.

In the example of FIG. 10C, the page aggregation state is "4," and the necessary rotating process is "0°" for the left-top page, the right-top page, and the left-bottom page and "RIGHT 90°" for the right-bottom page. Thus, the left-top page, the right-top page, and the left-bottom page are not rotated, and the right-bottom page is rotated right by 90°. Moreover, the printed document is divided into page A corresponding to the left-top page, page B corresponding to the right-top page, page C corresponding to the left-bottom page, and page D corresponding to the right-bottom page. Moreover, a document format having a predetermined file format is generated for these pages A, B, C, and D.

As above, since the rotating process is performed with respect to objects included in the original page, the processing load is suppressed as compared to a case where the rotating process is performed with respect to the entire original page.

Figure 11:
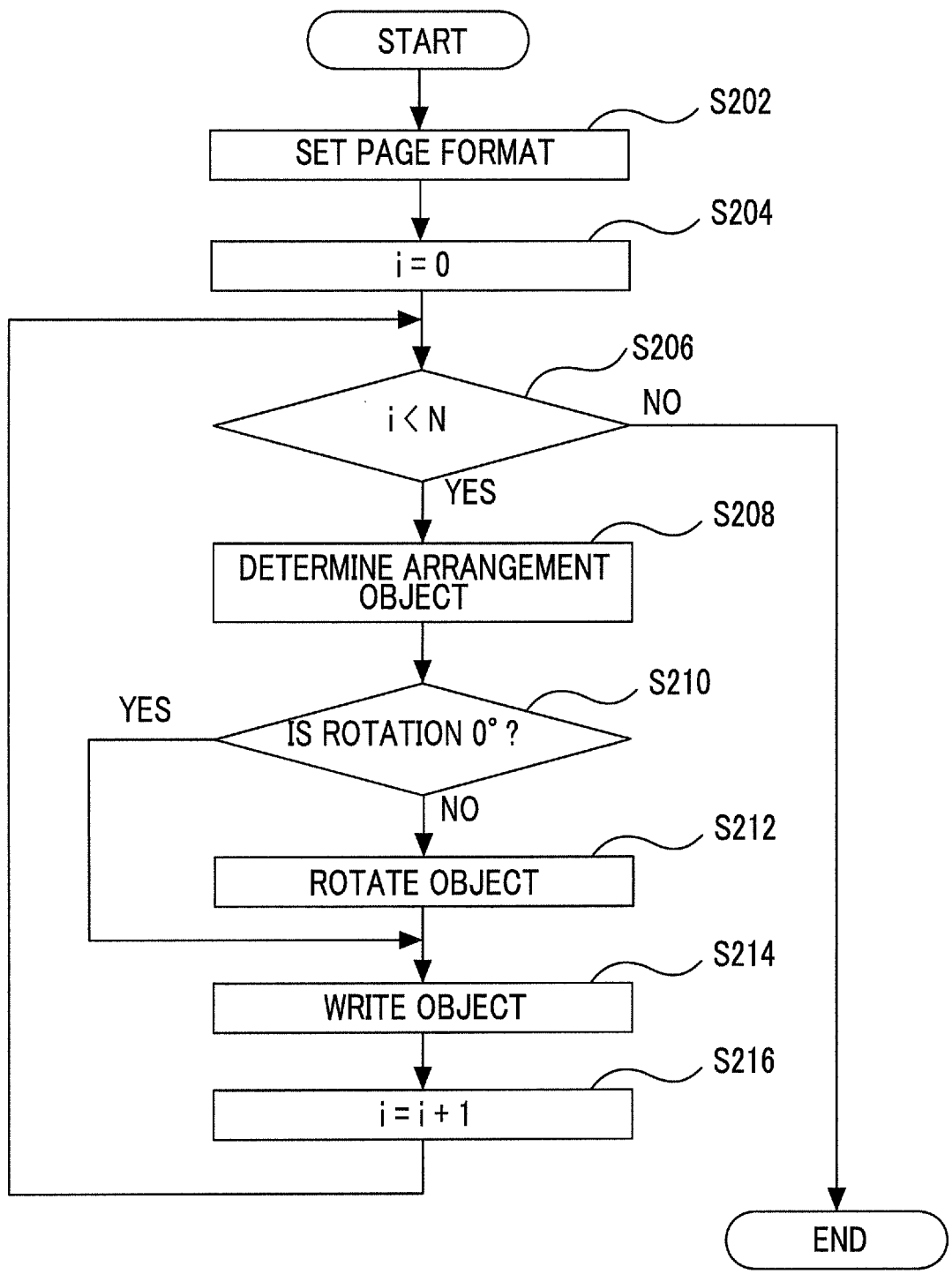
FIG. 11 is a flowchart of the document format conversion process to which an exemplary embodiment of the invention is applied.

FIG. 11 illustrates the flowchart of the document format conversion process (S20).

In step S202, a page format is set. Specifically, the number (the number of divided pages) of original pages aggregated in the read printed document, a vertical/lateral direction of a sheet corresponding to each of the original pages, a sheet size, and the like are set.

In step S204, a counter "i" is set to "0." The counter "i" represents the number corresponding to an input printed document which is subjected to the conversion process.

In step S206, it is determined whether the counter "i" is smaller than the total number (N) of the printed documents. The flow proceeds to step S208 when the counter "i" is smaller than "N," and the conversion process ends when the counter "i" is equal to or greater than "N."

In step S208, objects to be arranged in each of the original pages included in a printed document corresponding to the counter "i" are determined.

In step S210, it is determined whether the rotating process for the arranged objects is "0°." The flow proceeds to step S212 when the rotating process is not "0°," and proceeds to step S214 when the rotating process is "0°."

In step S212, the objects are rotated.

In step S214, the objects are written on the corresponding original page.

In step S216, the counter "i" is increased (i=i+1). Then, the flow proceeds to step S206.

Comparative Example

Next, a comparative example of the conversion process will be described.

Figures 12A, 12B, 12C:
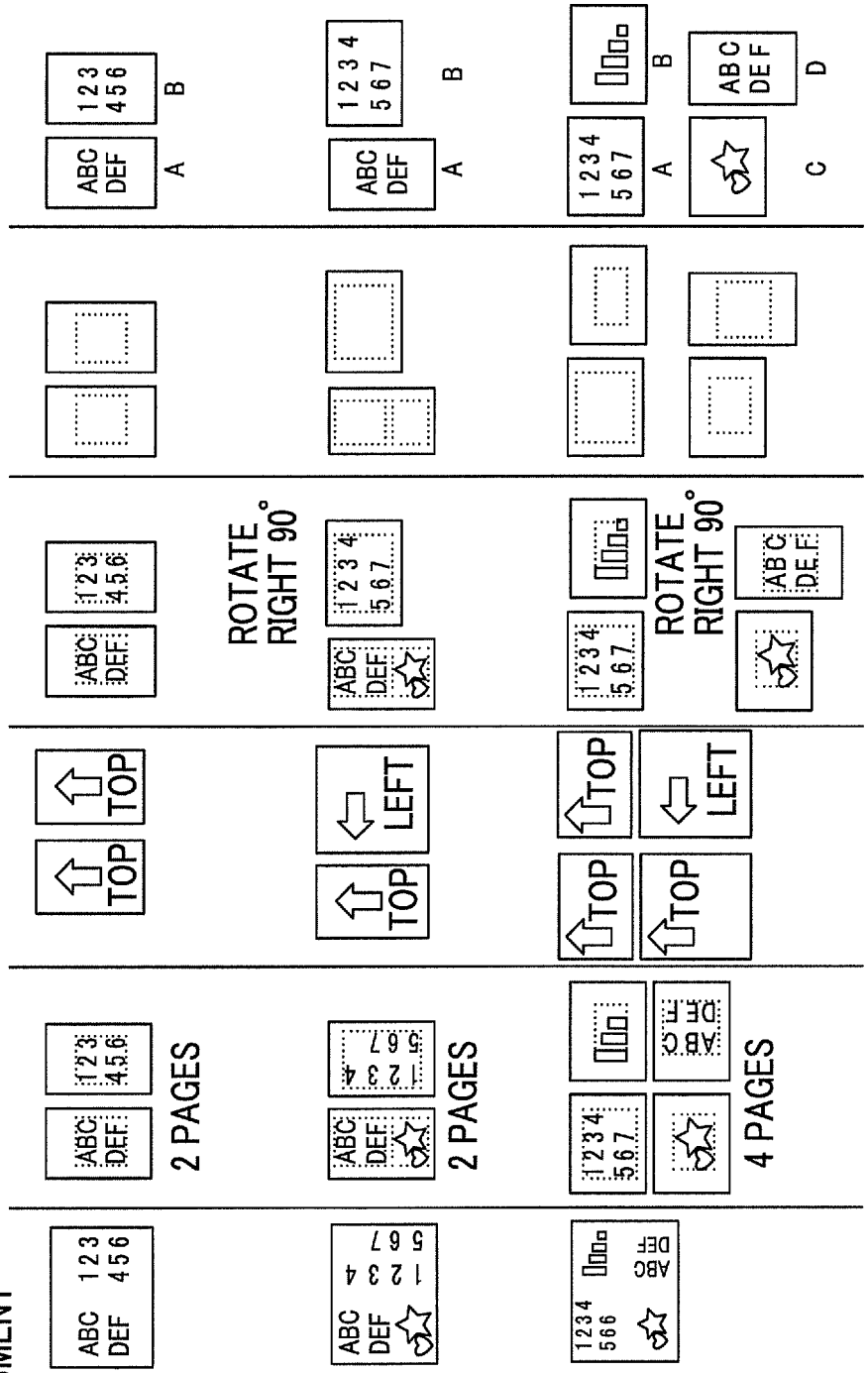
FIGS. 12A to 12C are views schematically illustrating an overview of conversion of the document format of a print image according to a comparative example.

FIGS. 12A to 12C schematically illustrate an overview of the conversion of the document format of a read print image in the comparative example.

First, the entire surface of a read printed document is scanned, and the page aggregation state is determined based on the scanning result. Moreover, the printed document is divided into original pages based on the determination result of the page aggregation state.

Subsequently, the printing direction of each of the divided original pages is determined. The erecting process is performed with respect to an entire original page of each of the original pages based on the determination result of the printing direction. In this comparative example, when it is not possible to detect the erected direction of the original page, the printing direction of the present page is determined to be the same as that of the previous page.

In this case, since the rotating process is performed with respect to the entire page of each of the original pages, the processing load increases as compared to a case where the rotating process is performed with respect to objects included in the original page. Moreover, since picture objects are generally JPEG-compressed, the image quality deteriorates when the rotating process is performed on the JPEG-compressed data.

Subsequently, the entire surface of the erected original page is scanned and separated into objects, and an object list is created. Moreover, the document format is converted based on the object list.

As above, in the comparative example, it is necessary to scan the entire surface of the printed document at least twice when determining the page aggregation state and creating the object list. Thus, the processing load increases as compared to a case where the entire surface of the printed document is scanned once.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
   an image object separating unit that separates a read printed document into image objects;
   a page aggregation state determining unit that determines a page aggregation state of the read printed document based on a layout of the image objects separated by the image object separating unit by (1) receiving a detection of a boundary line from an identified overlap between objects located within identified sections of the read printed document and (2) by comparing the boundary line with a layout of a page aggregation state stored in advance, thereby identifying which page aggregation state of the read printed document;
   a printing direction determining unit that determines a printing direction of each image object determined by the page aggregation state determining unit based on features of each text object separated by the image object separating unit; and
   a document format converting unit that converts a document format of the read printed document based on the results of the determination by the page aggregation state determining unit and the printing direction determining unit.

2. The image processing device according to claim 1, wherein
   the document format converting unit converts the document format of each of the image objects separated by the image object separating unit.

3. The image processing device according to claim 1, wherein
   when the page aggregation state determining unit determines that a plurality of pages are aggregated in the read printed document, the document format converting unit converts the document format for each of the image objects.

4. The image processing device according to claim 2, wherein
   when the page aggregation state determining unit determines that a plurality of pages are aggregated in the read printed document, the document format converting unit converts the document format for each of the image objects.

5. The image processing device according to claim 3, wherein
   when the page aggregation state determining unit determines a plurality of page aggregation states, the document format converting unit selects a page aggregation state corresponding to the smallest number of image objects.

6. The image processing device according to claim 4, wherein
   when the page aggregation state determining unit determines a plurality of page aggregation states, the document format converting unit selects a page aggregation state corresponding to the smallest number of image objects.

7. The image processing device according to claim 3, further comprising:
   a page conversion designating unit that designates whether or not to convert the document format for each of the image objects.

8. The image processing device according to claim 4, further comprising:
   a page conversion designating unit that designates whether or not to convert the document format for each of the image objects.

9. The image processing device according to claim 1, wherein
   when the printing direction determining unit determines that there is a page of which the printing direction is different from a predetermined printing direction, the document format converting unit rotates the page having the different printing direction in a predetermined direction and converts the document format.

10. The image processing device according to claim 2, wherein
    when the printing direction determining unit determines that there is a page of which the printing direction is different from a predetermined printing direction, the document format converting unit rotates the page having the different printing direction in a predetermined direction and converts the document format.

11. The image processing device according to claim 9, wherein
    the document format converting unit rotates each of the image objects separated by the image object separating unit.

12. The image processing device according to claim 10, wherein
    the document format converting unit rotates each of the image objects separated by the image object separating unit.

13. An image processing system comprising:
    an image reading device that reads a printed document;
    an image object separating unit that separates the printed document read by the image reading device into image objects;
    a page aggregation state determining unit that determines a page aggregation state of the read printed document based on a layout of the image objects separated by the image object separating unit by (1) receiving a detection of a boundary line from an identified overlap between objects located within identified sections of the read printed document and (2) by comparing the boundary line with a layout of a page aggregation state stored in advance, thereby identifying which page aggregation state of the read printed document;
    a printing direction determining unit that determines a printing direction of each of image objects determined by the page aggregation state determining unit based on the features of each of the image text objects separated by the image object separating unit; and
    a document format converting unit that converts a document format of the read printed document based on the results of the determination by the page aggregation state determining unit and the printing direction determining unit.

14. An image processing device comprising:
    an image object separating unit that separates an original page of a read printed document into objects and determines the type of each object, wherein the type of at least one of the objects is text and the type of another one of the objects is graphic;
    a printing direction determining unit that determines a printing direction of each object determined based on the type of each object separated by the image object separating unit and based on a erected direction detected for each text object; and wherein when multiple objects are included in the original page, different rotating processes are applied to each respective objects included in the original page so that the erecting process is applied to only a text object included in the original page and so that the rotating process is not applied to graphic objects, and the rotating process is set individually for the respective graphic objects.

\* \* \* \* \*